United States Patent [19]

Bernardi

[11] 4,120,536

[45] Oct. 17, 1978

[54] WHEEL EQUIPPED WITH BRAKE, PARTICULARLY FOR MOTOR-CYCLES

[76] Inventor: Dario Bernardi, Via Mazzini 5, Cattolica, (Prov Forli), Italy

[21] Appl. No.: 607,987

[22] Filed: Aug. 26, 1975

[30] Foreign Application Priority Data

Aug. 30, 1974 [IT] Italy .............................. 44027 A/74

[51] Int. Cl.² .............................................. B60T 1/02
[52] U.S. Cl. ................................... 301/6 E; 301/6 V; 188/18 A
[58] Field of Search ...................... 188/17, 18 R, 18 A, 188/71.1, 71.3–71.6, 26; 301/6 R, 6 LS, 6 E, 6 V, 5 R, 6 WB

[56] References Cited

U.S. PATENT DOCUMENTS

| | | | |
|---|---|---|---|
| 1,077,434 | 11/1913 | Siebert et al. | 301/6 W |
| 1,299,301 | 4/1919 | Churchill | 301/6 R |
| 1,670,320 | 5/1928 | Thompson, Jr. | 301/6 CS |
| 2,943,827 | 7/1960 | Hartel | 301/6 A |
| 3,521,932 | 7/1970 | Beebe | 301/6 R |
| 3,709,561 | 1/1973 | De Biasse | 301/6 V |
| 3,776,597 | 12/1973 | Camps | 301/6 V |

FOREIGN PATENT DOCUMENTS 979,823  1/1965  United Kingdom ...................... 188/26

Primary Examiner—Robert B. Reeves
Assistant Examiner—H. Grant Skaggs
Attorney, Agent, or Firm—Guido Modiano; Albert Josif

[57] ABSTRACT

A wheel with a brake, particularly adapted for motor-cycles, including a disc brake having an annular disc arranged concentrically to the axis of the wheel and secured to the hub thereof, and a braking shoe-holder supported internally to the annular disc with braking pads arranged in arms of the braking shoe-holder extending substantially radially towards the outer periphery of the annular disc. The arrangement of the braking shoe-holder internally to the annular disc allows the spokes of the wheel to be arranged more inclined with respect to the central plane of the wheel, thus giving more stability to the motor-cycle during run.

1 Claim, 8 Drawing Figures

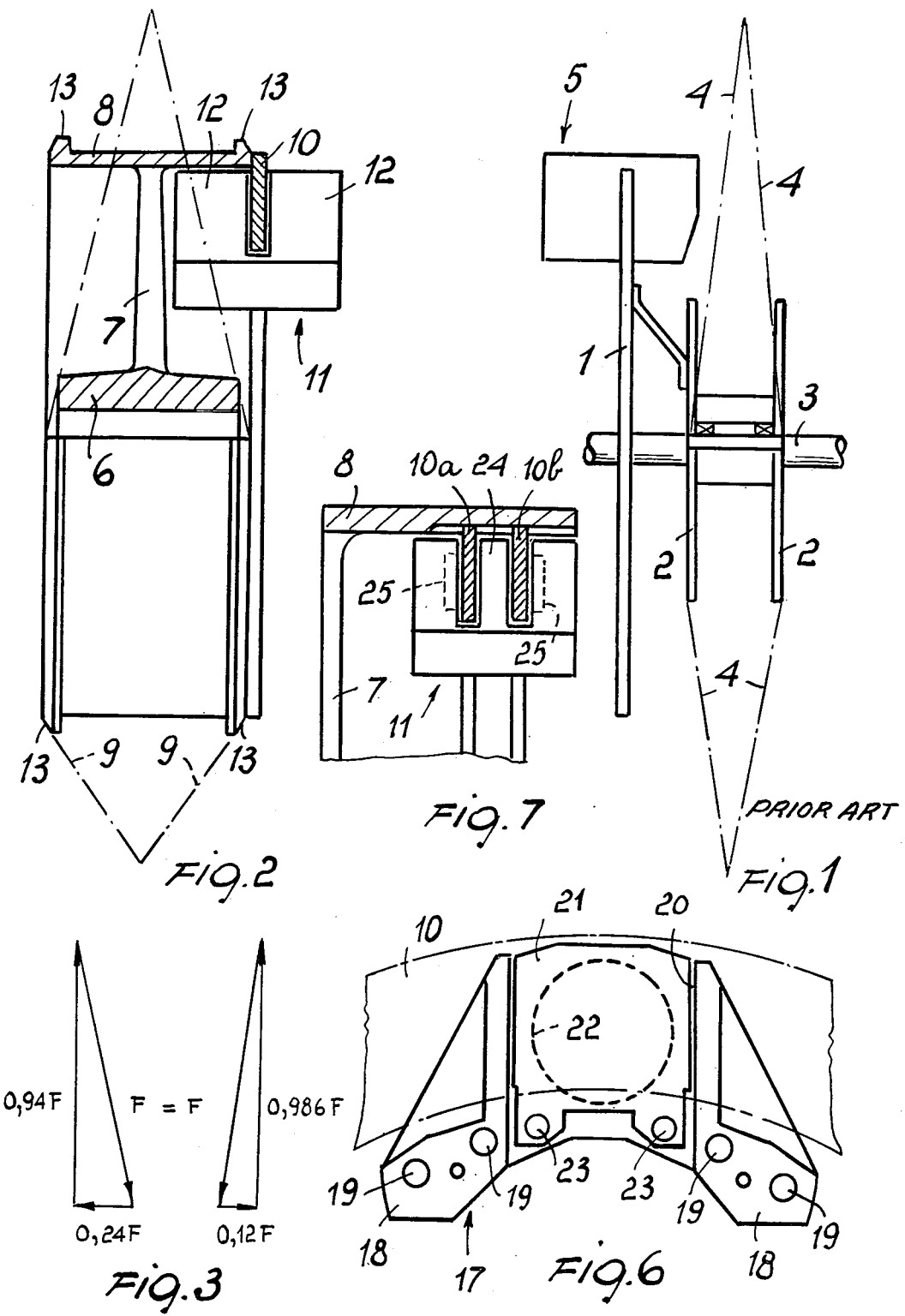

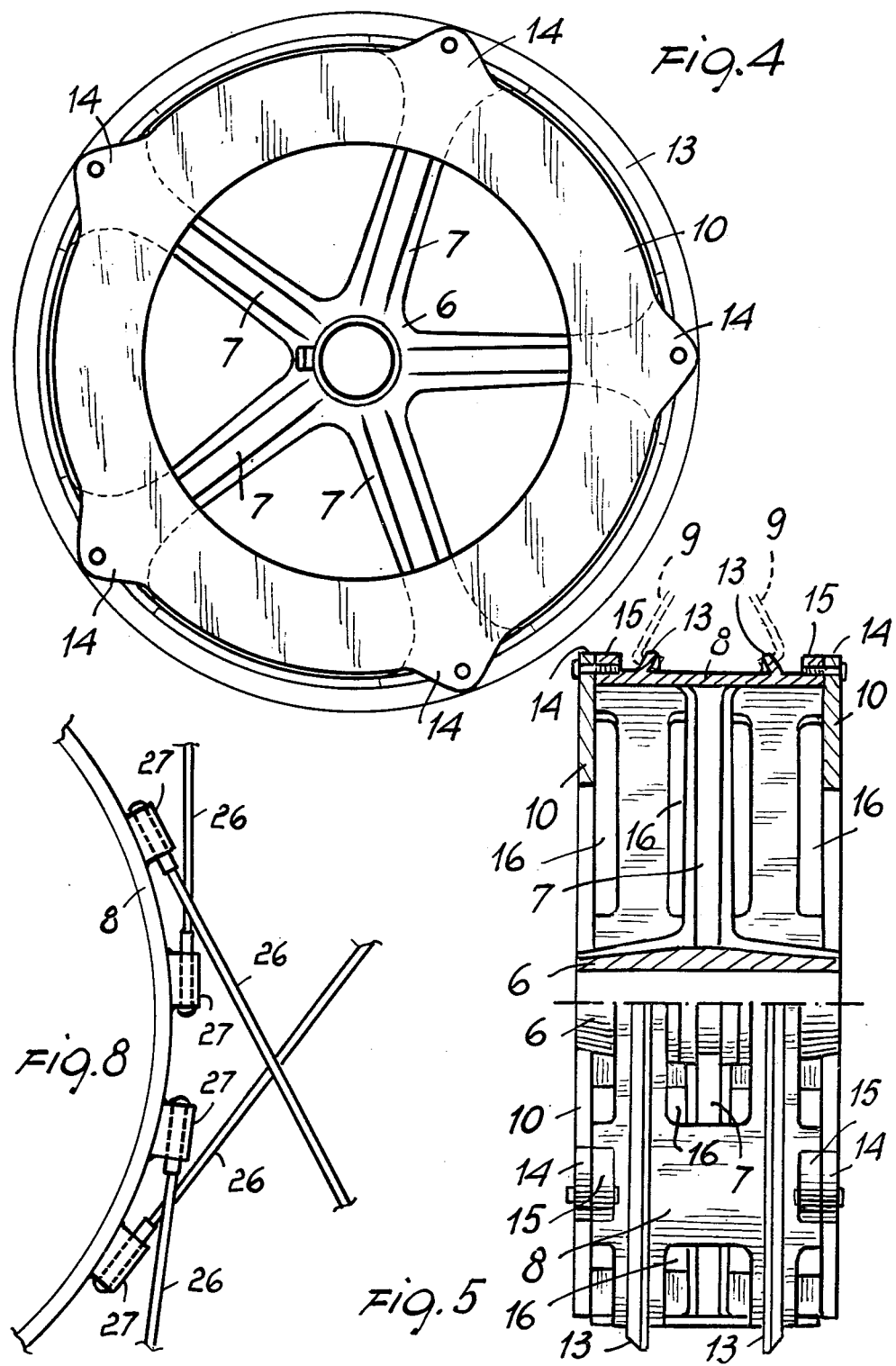

WHEEL EQUIPPED WITH BRAKE, PARTICULARLY FOR MOTOR-CYCLES

BACKGROUND OF THE INVENTION

The present invention relates to a wheel equipped with brake, particularly for motor-cycles.

It is known that the arrangement of braking means for example on a motor-cycle wheel involves constructional problems originating from the necessity to maintain a limited transversal encumbrance of the wheel, so as not to produce an excessive air resistance, and to guarantee a sufficient stability for the motor-cycle, particularly on curves.

At present known wheels have a braking disc co-axial to the wheel and a braking shoe which bridges the disc and embraces it externally.

In a structure of this type, in order to maintain a limited overall transversal encumbrance and to limit thus the main section of the wheel, it is necessary to arrange the wheel spokes or other equivalent means with a reduced angle with respect to the plane of the wheel. This reduced angle of the spokes results in a lower transversal stability of the motor-cycle, particularly on curves. To improve this stability it would instead be necessary to have the spokes arranged to form a greater angle, but this would require that the braking disc and the shoe be arranged more externally with respect to the central plane of the wheel, thus increasing the transversal dimension of the wheel and consequently the air resistance on the advancing motor-cycle.

SUMMARY OF THE INVENTION

One object of the present invention is to overcome these inconveniences and these limitations, by providing a wheel with a braking device such as to improve the stability of the machine to which the wheel is applied without however increasing the air resistance.

Another object of the present invention is to provide a brake which can be applied to any type of wheel, not necessarily of a motor-cycle and not necessarily with spokes but even a completely solid light alloy cast wheel.

These and other objects, which will be more evident hereinafter, are attained by a wheel equipped with brake, particularly for motor-cycles, characterized in that the brake comprises at least an annular braking disc which can rigidly rotate with the wheel and at least a brake shoe-holder supported internally of said annular disc with the braking elements developing radially outwards with respect to said disc.

In this manner the space usually occupied by the braking shoe or shoes in known wheels is free to allow a more open arrangement of the spokes, which may thus have any angular spacing starting practically from an outer most radial point of the maximum radius of the annular disc. The internal arrangement of the braking shoe or shoes within the annular disc allows the application, without difficulty, of double-acting shoes, something which is normally not easy in the case of known wheels, in that the mobile control of the shoe provided on the side of the spokes is constructively difficult to obtain.

BRIEF DESCRIPTION OF THE DRAWINGS

Further characteristics and advantages of the invention will appear better from the following description of a preferred but not exclusive embodiment of a wheel according to the invention, illustrated by way of example in the accompanying drawings in which:

FIG. 1 is a diagrammatic view of an arrangement according to prior art;

FIG. 2 is a diagrammatic view of an embodiment according to the invention;

FIG. 3 is a diagram of the forces involved respectively in the case of a wheel according to the invention and one according to prior art;

FIG. 4 is a front view of the central portion of a wheel according to the invention;

FIG. 5 is a view half in section through a plane passing through a spoke of the wheel of FIG. 3;

FIG. 6 illustrates a braking shoe applicable to a wheel according to the invention;

FIG. 7 illustrates a modification of the brake according to the invention; and

FIG. 8 shows a particular type of engagement of the spokes to the central portion of the wheel according to the invention.

DESCRIPTION OF THE PREFERRED EMBODIMENTS

As schematically shown in FIG. 1, a wheel made according to prior art has a brake disc 1 concentric to the wheel and fixed to the flanges 2 of the wheel, in their turn fixed to the axis 3 of the wheel. FIG. 1 also shows the spokes 4, which, having once established their length and the transversal encumbrance of the wheel as is illustrated in the figure, may at the most be arranged according to the angular spacing illustrated in the figure (it has to be observed that normally the spokes are not arranged radially, but more or less tangentially to the flanges 2).

This known arrangement, in which the braking shoe 5 is arranged externally and bridging the brake disc 1, does not allow to increase the angular spacing between the spokes and consequently to improve the transversal stability, unless the transversal encumbrance of the wheel is increased, with consequently an increase in the main section and thus of the air resistance in motion.

A wheel made according to the invention, represented schematically in FIG. 2, has on the other hand in addition to a central hub 6 with spokes or brackets 7 supporting a sleeve or a cylindrical shell 8, to which are fixed the spokes 9, at least an annular disc 10, for the brake disc according to the invention and fixed to a lateral circumferential edge of said sleeve or shell 8, and a braking shoe 11, arranged internally to the annular disc 10 and provided with braking elements 12 extending radially outward with respect to the wheel. This arrangement allows to overcome the limitations and inconveniences of the known wheel. As is in fact clearly deducible by comparing FIGS. 1 and 2, assuming equal dimensions respectively of the disc and of the annular braking disc and an equal distance thereof from the central plane of the wheel, an embodiment according to the invention allows to arrange the wire spokes with a far greater inclination than that according to prior art, for spokes of equal length. In fact, the wire spokes may be fixed to a cylindrical outer surface of the sleeve through connecting means or ribbings 13 in a point which is radially outermost than the maximum radius of the braking ring where there do not exist limitations in an axial direction, which in a wheel made according to prior art is not possible without simultaneously increasing the transversal encumbrance.

It will be appreciated that the lateral extension of the sleeve 8 in a direction parallel to the axis of rotation of the wheel which lateral extension is delimited by lateral circumferential edges 8a is greater than the thickness of the bracket members in the direction of said lateral extension so that a free space is provided therebetween for a part of the bracking element 12.

FIG. 3 shows the diagram of the forces exerted on the spokes in the two considered cases. Considering for example the inclinations illustrated in the Figures, it is evident that assuming an equal traction F on the spokes of equal length, the radial component in the wheel according to the invention varies relatively little with respect to that of the known wheel (0.94F instead of 0.986F), while the transversal component doubles (0.24F instead of 0.12F). It may thus be ascertained that with the wheel according to the invention it is undoubtedly possible to double without difficulty the stability of the machine to which the wheel is applied.

FIGS. 4 and 5 illustrate an example of a practical embodiment of the invention. In these Figs. the elements equivalent to those of FIG. 2 are indicated with the same reference numerals. The annular disc 10 has a certain number of ears 14 distributed peripherally thereon for fixing it to the cylindrical shell 8, which has in its turn corresponding ears 15. Conveniently the shell is provided with an aperture 16 which allows the passage of air for a better elimination of the heat produced by the braking action. FIG. 5 illustrates in addition a way of fixing the spokes 9. It is understood however that such fixing may be accomplished also in other ways.

In the illustrative embodiment illustrated in FIGS. 4 and 5 there has been provided the application of two annular braking discs 10 one on each side of the wheel; it is understood however that it is possible also to apply an only disc, in which case on the opposite side there may be arranged suitable counterweights. For the sake of simplicity the corresponding braking shoes have not been represented.

A particulariy convenient embodiment of these shoes for the wheel according to the invention is represented in FIG. 6. Since the shoe is provided so as to be arranged internally to the annular disc 10, it has a shape with a curvature opposite to that of conventional braking shoes, i.e. a convex rather than a concave shape. The shoe consists of two elements 17, each of which is provided with appendices 18 extending outwards so as to confer to the shoe the convex shape and having holes 19 for fastening the two elements 17 together. Each element is provided with a seat 20 for housing pads 21 as well as a cylindrical cavity 22 for housing the piston (not shown) which presses the pad 21 by hydraulic action against the annular braking disc 10. This has been indicated in sketching in the drawing since it is arranged in front of the element 17 illustrated. The pad 21 is associated to the elements 17 through the holes 23 and it moves in a perpendicular direction with respect to the plane of the drawing.

FIG. 7 shows a modification of the invention, which has two spaced braking discs 10a, 10b, both arranged on a same part of the wheel, the two discs being provided each with its own braking shoe, or there being arranged between the discs a fixed braking element 24 and the shoes with pads 25 acting externally on the annular discs 10a, 10b. In this case it may be convenient to have one or both of the annular discs 10a, 10b, axially displaceable so as to be pressed by the pads 25 against the fixed braking element 24 during braking action.

FIG. 8 shows a modification as far as the engagement of the wire spokes 26 is concerned, which are fixed in appendices 27 arranged in spaced configuration on the two sides of the central portion of the wheel instead of the ribbings 13.

The described invention, which attains the proposed objects, is susceptible to numerous modifications, all falling within the scope of the inventive concept. For example it is possible to apply the invention also to wheels not provided with spokes but to wheels with beams or to wheels cast in a single piece of light alloy. It is understood that the invention may be applied both to front and to rear wheels of a vehicle.

The annular disc or annular discs may obviously be provided with holes or notches for lightening and/or heat elimination. Naturally it is also possible to make the annular disc or annular discs in a single piece by casting with the structure 6, 7, 8. For cooling the discs it is also possible to arrange fins for conveying the air on the discs themselves.

I claim:

1. A wire spoke wheel and brake assembly particularly for motorcycles, comprising in combination a hub member defining a wheel axis of rotation and a sleeve member coaxial and concentric therewith and circumferentially spaced therefrom, bracket members rigidly connecting said sleeve member with said hub member, said sleeve member having a cylindrical outer surface extending parallel to said wheel axis of rotation and including connecting means for connecting thereon wire spokes for the wheel rim, said wire spokes extending from said sleeve member on the side thereof remote from said hub member, said sleeve member having a lateral extension parallel to the wheel axis of rotation and lateral circumferential edges delimiting said lateral extension thereof, said bracket members having at least near said sleeve member a thickness in the direction of said lateral extension smaller than said lateral extension of said sleeve member thereby to provide a free space between said lateral circumferential edges and said bracket members, at least one braking annular disc coaxial with said axis of rotation and extending in a plane perpendicular thereto, said annular braking disc being fixed to one of said lateral circumferential edges and having one annular portion thereof extending radially from said sleeve member towards said hub member, a braking element surrounding a portion of said braking disc at said annular portion thereof extending towards said hub member and wherein said sleeve member has apertures in said cylindrical surface thereof for the passage of cooling air therethrough.

* * * * *